(12) United States Patent
Liang et al.

(10) Patent No.: US 10,437,043 B2
(45) Date of Patent: Oct. 8, 2019

(54) DISPLAY PANEL AND MANUFACTURING METHOD THEREOF, AND DISPLAY DEVICE

(71) Applicant: BOE TECHNOLOGY GROUP CO., LTD., Beijing (CN)

(72) Inventors: Pengxia Liang, Beijing (CN); Xin Gu, Beijing (CN); Kang Guo, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/567,263

(22) PCT Filed: Jun. 7, 2017

(86) PCT No.: PCT/CN2017/087436
§ 371 (c)(1),
(2) Date: Oct. 17, 2017

(87) PCT Pub. No.: WO2018/076702
PCT Pub. Date: May 3, 2018

(65) Prior Publication Data
US 2018/0292643 A1    Oct. 11, 2018

(30) Foreign Application Priority Data
Oct. 28, 2016    (CN) .......................... 2016 1 0967155

(51) Int. Cl.
*G02B 26/02*    (2006.01)
*G02F 1/1343*    (2006.01)
(Continued)

(52) U.S. Cl.
CPC .......... *G02B 26/02* (2013.01); *G02F 1/1333* (2013.01); *G02F 1/134309* (2013.01);
(Continued)

(58) Field of Classification Search
CPC ............ G02F 1/1333; G02F 1/133553; G02F 1/134309; G02F 1/133555;
(Continued)

(56) References Cited

U.S. PATENT DOCUMENTS 5,696,618 A    12/1997    Ji et al.
6,297,578 B1    10/2001    Takeuchi et al.
(Continued)

FOREIGN PATENT DOCUMENTS

CN    1246930 A    3/2000
CN    1463373 A    12/2003
(Continued)

OTHER PUBLICATIONS

International Search Report and Written Opinion dated Jul. 28, 2017; PCT/CN2017/087436.
(Continued)

*Primary Examiner* — Loha Ben

(57) ABSTRACT

A display panel and a manufacturing method thereof, and a display device are provided. The display panel includes a plurality of display units. Each display unit includes a first substrate and a second substrate opposite to each other. The first substrate includes a first base substrate and a first electrode, an electrostriction layer and a reflective trough which are disposed thereon. The second substrate includes a second base substrate and a second electrode and a reflective cavity body which are disposed thereon. A support is disposed between the first base substrate and the second base substrate, such that a distance between the first base substrate and the second base substrate is kept constant.

20 Claims, 3 Drawing Sheets

(51) Int. Cl.
*G02F 1/1333* (2006.01)
*G02F 1/19* (2019.01)
*G02F 1/1335* (2006.01)
*G09F 9/302* (2006.01)
*G02F 1/157* (2006.01)

(52) U.S. Cl.
CPC ........ *G02F 1/195* (2013.01); *G02F 1/133555* (2013.01); *G02F 1/157* (2013.01); *G09F 9/302* (2013.01)

(58) Field of Classification Search
CPC ......... G02F 1/134363; G02F 1/136227; G02F 1/1341; G02F 1/1335; G02F 1/15; G02F 1/155; G02F 1/157; G02F 1/167; G02F 2001/133357; G02F 1/195; G02B 26/00; G02B 26/02; G02B 26/08; G02B 26/0833; G09F 9/302; G09F 9/305; G09F 9/37; G09F 9/372; G09F 9/375
USPC ...... 359/290, 291, 295, 298; 345/30, 44, 48, 345/55, 84, 85, 87, 108; 349/113, 114
See application file for complete search history.

(56) References Cited

U.S. PATENT DOCUMENTS

| | | | |
|---|---|---|---|
| 6,724,973 B1* | 4/2004 | Takeuchi | G02B 26/02 385/147 |
| 6,753,846 B2* | 6/2004 | Takeuchi | G09F 9/305 345/108 |
| 6,753,998 B2* | 6/2004 | Takeuchi | G02B 6/0068 345/108 |
| 7,405,884 B2* | 7/2008 | Nishioka | G02B 3/14 348/E5.025 |
| 2003/0063046 A1 | 4/2003 | Takeuchi et al. | |
| 2016/0147128 A1 | 5/2016 | Loxley et al. | |
| 2017/0212373 A1 | 7/2017 | Sai et al. | |
| 2018/0031941 A1* | 2/2018 | Goulding | G02F 1/167 |
| 2018/0088411 A1* | 3/2018 | Zhang | G02F 1/133377 |
| 2018/0088434 A1* | 3/2018 | Liang | G02F 1/1362 |
| 2018/0088435 A1* | 3/2018 | Liang | G02F 1/167 |

FOREIGN PATENT DOCUMENTS

| | | |
|---|---|---|
| CN | 1469178 A | 1/2004 |
| CN | 101427179 A | 5/2009 |
| CN | 102819161 A | 12/2012 |
| CN | 103823323 A | 5/2014 |
| CN | 105474085 A | 4/2016 |
| CN | 105652528 A | 6/2016 |
| CN | 106019573 A | 10/2016 |
| CN | 106681063 A | 5/2017 |
| EP | 2008152 | 12/2008 |
| JP | 07151984 A | 6/1995 |
| JP | 2011-248065 A | 12/2011 |
| JP | 2012-181237 A | 9/2012 |
| WO | 2007/118306 A1 | 10/2007 |

OTHER PUBLICATIONS

The first Chinese Office Action dated Feb. 12, 2019; Appln. No. 201610967155.1.

* cited by examiner

DISPLAY PANEL AND MANUFACTURING METHOD THEREOF, AND DISPLAY DEVICE

TECHNICAL FIELD

At least one embodiment of the present disclosure relates to a display panel and a manufacturing method thereof, and a display device.

BACKGROUND

Generally, for a reflective product taking a total reflection technology as a core, its structure comprises a light-reflection thin film and charged particles behind the thin film, and a principle thereof is to change a total reflection intensity of the light-reflection thin film by adjusting positions of the charged particles, so as to further change a display brightness of the thin film.

SUMMARY

At least one embodiment of the present disclosure provides a display panel, including a plurality of display units, each display unit including a first substrate and a second substrate opposite to each other, and a support, wherein:

the first substrate includes a first base substrate, a first electrode, an electrostriction layer and a reflective trough, which are disposed thereon;

the second substrate includes a second base substrate, a second electrode and a reflective cavity body, which are disposed thereon; and the support is disposed between the first base substrate and the second base substrate, such that a distance between the first base substrate and the second base substrate is kept constant.

The reflective trough has a recessed portion, the reflective cavity body has a protruding portion, and a surface of the recessed portion of the reflective trough matches with a surface of the protruding portion of the reflective cavity body.

The first electrode and the second electrode are configured to form an electric field, and the electrostriction layer is deformable in a direction perpendicular to the first base substrate under an action of the electric field, such that a thickness of the electrostriction layer is increased or decreased to convert between a state where a gap presents between the recessed portion of the reflective trough and the protruding portion of the reflective cavity body and a state where the surface of the recessed portion of the reflective trough and the surface of the protruding portion of the reflective cavity body are in close fit.

At least one embodiment of the present disclosure provides a manufacturing method for a display panel, including:

forming a first electrode, an electrostriction layer and a reflective trough on a first base substrate to manufacture a first substrate, forming a second electrode and a reflective cavity body on a second base substrate to manufacture a second substrate, opposing the first substrate to the second substrate, and forming a support between the first base substrate and the second base substrate, such that a distance between the first base substrate and the second base substrate is kept constant, wherein:

the reflective trough has a recessed portion, the reflective cavity body has a protruding portion, and a surface of the recessed portion of the reflective trough matches with a surface of the protruding portion of the reflective cavity body; and the first electrode and the second electrode are configured to form an electric field, the electrostriction layer is deformable in a direction perpendicular to the first base substrate under an action of the electric field, such that a thickness of the electrostriction layer is increased or decreased to convert between a state where a gap presents between the recessed portion of the reflective trough and the protruding portion of the reflective cavity body and a state where the surface of the recessed portion of the reflective trough and the surface of the protruding portion of the reflective cavity body are in close fit.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
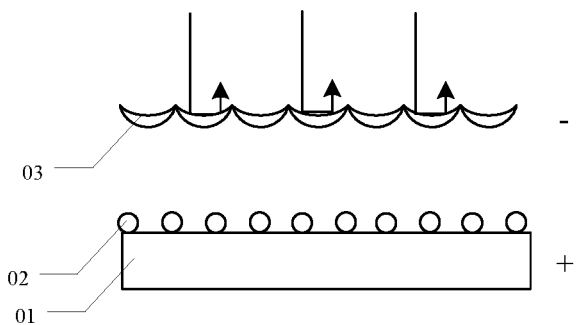
FIG. 1 is a schematic diagram of a total reflection display device.

FIG. 1 shows a total reflection display device, including a back plate 01, a light-reflection thin film 03 and electronic ink 02 disposed therebetween. The electronic ink 02 contains charged particles. Electrodes can be disposed on surfaces of the back plate 01 and the light-reflection thin film respectively. A total reflection intensity of the light-reflection thin film 03 is changed by adjusting positions of the charged particles, so as to further change display brightness. In a case of not powering on, the charged particles are uniformly dispersed in the electronic ink 02, and light passing through the light-reflection thin film 03 is subjected to total reflection. In a case of powering on, the charged particles in the electronic ink 02 can be aggregated on a side of the light-reflection thin film 03 under the action of an electric field; therefore, the light passing through the light-reflection thin film 03 is refracted into the aggregated charged particles. However, in such structure, phenomena of unevenness and light leakage will be caused if particle motion is controlled, and a barrier wall needs to be manufactured to reduce particle agglomeration, and the structure is relatively complex. Such product structure relies on a difference value between refractive indexes of the light-reflection thin film 03 and the electronic ink 02, and has high requirement on the refractive index of a material.

At least one embodiment of the present disclosure provides a display panel, including a plurality of display units, and each display unit includes a first substrate and a second substrate opposite to each other. The first substrate includes a first base substrate and a first electrode, an electrostriction layer and a reflective trough which are disposed thereon. The second substrate includes a second base substrate and a second electrode and a reflective cavity body which are disposed thereon. A support is disposed between the first base substrate and the second base substrate, such that a distance between the first base substrate and the second base substrate is kept constant. The reflective trough has a recessed portion, the reflective cavity body has a protruding portion, and a surface of the recessed portion of the reflective trough matches with a surface of the protruding portion of the reflective cavity body. the first electrode and the second electrode are configured to form an electric field, the electrostriction layer is deformable in a direction perpendicular to the first base substrate under an action of the electric field, such that a thickness of the electrostriction layer is increased or decreased to convert between a state where a gap presents between the recessed portion of the reflective trough and the protruding portion of the reflective cavity body and a state where the surface of the recessed portion of the reflective trough and the surface of the protruding portion of the reflective cavity body are in close fit.

The display panel according to at least one embodiment of the present disclosure is simple in structure and easy to manufacture and performs light regulation by adopting a mechanical deformation manner for display.

Explanation is carried out by several embodiments in the following.

Embodiment 1

Figure 2:
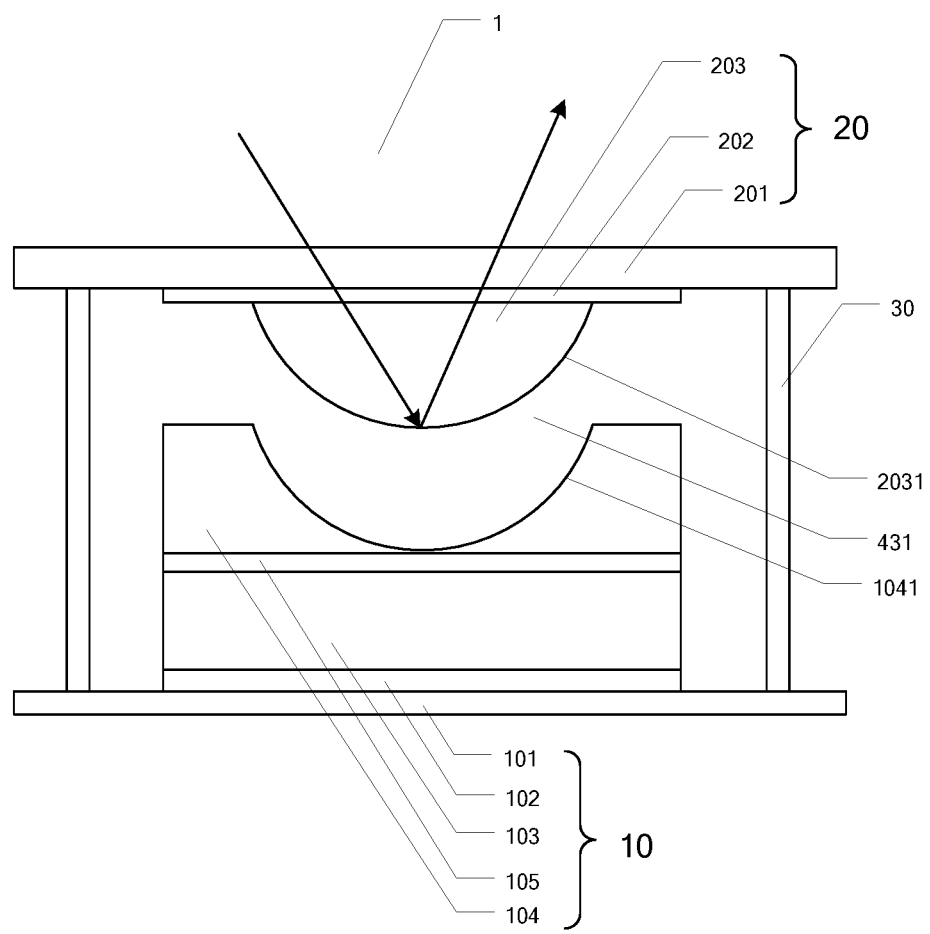
FIG. 2 is a schematic diagram of a display panel provided by Embodiment 1 of the present disclosure (a gap is formed between a recessed portion of a reflective trough and a protruding portion of a reflective cavity body)

The present embodiment provides a display panel, and as shown in FIG. 2, the display panel comprises a plurality of display units 1. Each display unit 1 includes a first substrate 10 and a second substrate 20 opposite to each other.

As shown in FIG. 2, the first substrate 10 includes a first base substrate 101 and a first electrode 102, an electrostriction layer 103 and a reflective trough 104 which are disposed thereon. For example, the first base substrate 101 can be provided with the first electrode 102, the electrostriction layer 103 and the reflective trough 104 in sequence. The second substrate 20 includes a second base substrate 201 and a second electrode 202 and a reflective cavity body 203 which are disposed thereon. A support 30 is disposed between the first base substrate 101 and the second base substrate 201, such that a distance between the first base substrate 101 and the second base substrate 201 is kept constant.

As shown in FIG. 2, the reflective trough 104 has a recessed portion 1041, the reflective cavity body 203 has a protruding portion 2031, and a surface of the recessed portion 1041 of the reflective trough 104 matches with a surface of the protruding portion 2031 of the reflective cavity body 203. The first electrode 102 and the second electrode 202 are insulated from each other and are configured to form an electric field, such that the electrostriction layer 103 is deformed (in shape, in stress) in a direction perpendicular to the first base substrate 101 under an action of the electric field, and a thickness of the electrostriction layer 103 is increased or decreased to convert between a state where a gap presents between the recessed portion 1041 of the reflective trough 104 and the protruding portion 2031 of the reflective cavity body 203 and a state where the surfaces of the both are in close fit. For example, different voltages can be applied to form a voltage difference between the first electrode 102 and the second electrode 202, thereby forming the electric field.

The expression "a surface of the recessed portion 1041 of the reflective trough 104 matches with a surface of the protruding portion 2031 of the reflective cavity body 203", for example, refers to that structures of the recessed portion 1041 and the protruding portion 2031 are complementary and the surfaces of both can be in close fit together.

Figure 3:
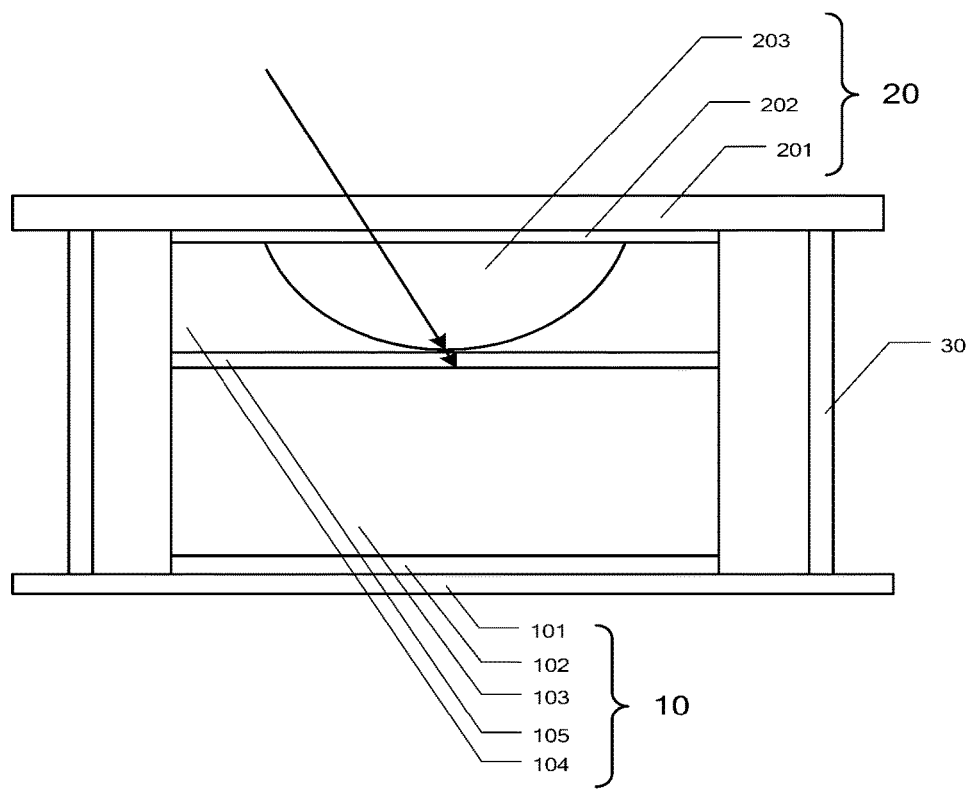
FIG. 3 is a schematic diagram of a display panel provided by Embodiment 1 of the present disclosure (surfaces of a recessed portion of a reflective trough and a protruding portion of a reflective cavity body are in close fit)

FIG. 2 shows a schematic diagram that the gap 431 is formed between the recessed portion 1041 of the reflective trough 104 and the protruding portion 2031 of the reflective cavity body 203. FIG. 3 shows a schematic diagram that surfaces of the recessed portion 1041 of the reflective trough 104 and the protruding portion 2031 of the reflective cavity body 203 are in close fit. For example, the gap 431 can be an air layer, but not limited thereto. For example, the gap 431 can be filled with other gases, for example, nitrogen gas or inert gas, etc. If other gases, except for air, are adopted as the filling gas, the periphery of a device needs to adopt an encapsulation package, such that the whole device is in atmosphere of such gas. The present embodiment takes the air layer as an example of the gap 431 for explanation. The display panel provided by the present embodiment can adopt the air to replace a low-refractive index filling material and to increase reflection efficiency. Supporting by a full solid material can be adopted, a product cost can be effectively reduced, and a yield is improved.

The display panel provided by the present embodiment is a reflective display panel, for example, when the electrostriction layer contracts in the electric field, the gap (crack) between the reflective cavity body and the reflective trough is filled with air, due to a total reflection law, Sin $\alpha = n_{thin}/n_{dense}$, natural light whose incident angle is greater than a critical angle is totally reflected back into the air at an interface between the reflective cavity body and the air layer, and sub-pixels present a white state. When the electrostriction layer stretches in the electric field, the air in the gap between the recessed portion 1041 of the reflective trough 104 and the protruding portion 2031 of the reflective cavity body 203 is extruded away, the recessed portion 1041 of the reflective trough 104 is in direct contact with the protruding portion 2031 of the reflective cavity body 203, total reflection disappears, and light rays can transmit through the reflective trough 104 and the reflective cavity body 203. The electric field can be formed by applying a voltage to adjust and control deformation of the electrostriction layer 103.

For example, as shown in FIG. 2, the display panel further includes a light absorption layer 105, and in order to obtain a better display effect, the light absorption layer 105 can be disposed between the electrostriction layer 103 and the reflective trough 104. Therefore, the light rays transmitting through the reflective trough 104 and the reflective cavity body 203 can enter the light absorption layer 105, and the light absorption layer 105 can include a color filter layer or a black array. Therefore, the sub-pixels can be colored or black, to achieve color display. The basic principle of a reflective color display mode is a total reflection regulation display technology. By adopting an electro-shrinkable material, the size of a total reflection gap between the recessed portion 1041 and the protruding portion 2031 is adjusted and controlled, thereby achieving a reflective color display effect. By adopting a reflection principle, ambient light is used for color display, and a reading effect is better under strong light. A disposing position of the light absorption layer 105 is not limited thereto as long as a light absorption action is achieved to realize color or black display.

In one example, the reflective trough 104 and the reflective cavity body 203 adopt a light transmittance material with a high refractive index, and the refractive index thereof is greater than that of the air layer. If the gap is filled with other gases, the refractive indexes of the reflective trough 104 and the reflective cavity body 203 are greater than that of a substance in the gap. For example, the refractive index of the reflective trough 104 is same or substantially same (approximate to) as that of the reflective cavity body 203. Therefore, in a case that the surfaces of the recessed portion 1041 of the reflective trough 104 and the protruding portion 2031 of the reflective cavity body 203 are in close fit, the light rays can transmit through the reflective trough 104 and the reflective cavity body 203. The term "substantially same" for example refers to that a difference between the refractive indexes of the reflective trough 104 and the reflective cavity body 203 is not large, and most light can enter the reflective trough 104 from the reflective cavity body 203 when the surfaces of the recessed portion 1041 of the reflective trough 104 and the protruding portion 2031 of the reflective cavity body 203 are in close fit. For example, the term "substantially same" refers to that the difference between the refractive indexes of the reflective trough 104 and the reflective cavity body 203 is within ±0.2, for example, a difference between the refractive indexes of the reflective trough 104 and the reflective cavity body 203 is less than 10% of the refractive index of the reflective cavity body 203, and further, for example, the difference is less than 5% and much further, the difference is less than 3%. For example, the refractive indexes of the reflective trough 104 and the reflective cavity body 203 are within a range of 1.6-1.8. By adopting the interface between the high between the high refractive index material and the air as a total reflection interface, due to the low refractive index of the air, reflection efficiency can be greatly improved, and requirements on the high refractive index material are reduced, so as to simplify material preparing and machining processes. The reflective cavity body and the reflective trough can be manufactured by adopting the materials with the same high refractive index; the electrostriction layer therebetween controls a thickness of the air layer between the reflective trough and the reflective cavity body, and lots of materials are applicable thereto. The refractive index of the air is 1, while the refractive index of general electronic ink is 1.3, and the reflection efficiency can be greatly improved. A difference value between the refractive indexes of the reflective trough 104 and the reflective cavity body 203 can affect a reflectivity. For example, materials of the reflective trough 104 and the reflective cavity body 203 can include resin, and the present embodiment does not limit the materials of the reflective trough 104 and the reflective cavity body 203.

For example, in order to better obtain the total reflection effect, the protruding portion 2031 of the reflective cavity body 203 can be hemispherical, but not limited thereto, for example, the protruding portion 2031 can also be prismatic, conical, tetrahedral and other shapes, which is not limited by the present embodiment as long as the total reflection can occur at the interface between the reflective cavity body 203 and the air layer. Because the structure of the recessed portion 1041 of the reflective trough 104 matches with the structure of the protruding portion 2031 of the reflective cavity body 203, the recessed portion 1041 of the reflective trough 104 can be hemispherical, prismatic, conical, tetrahedral and other shapes corresponding to the shape of the protruding portion 2031.

For example, in a case that the electric field is formed between the first electrode 102 and the second electrode 202, a thickness of the electrostriction layer 103 is increased; therefore, the surface of the recessed portion 1041 of the reflective trough 104 and the surface of the protruding portion 2031 of the reflective cavity body 203 are in close fit, while in a case that no electric field exists between the first electrode 102 and the second electrode 202, the gap 431 is formed between the recessed portion 1041 of the reflective trough 104 and the protruding portion 2031 of the reflective cavity body 203.

For example, in a case that the electric field is formed between first electrode 102 and the second electrode 202, a thickness of the electrostriction layer 103 is decreased, therefore, the gap 431 is formed between the recessed portion 1041 of the reflective trough 104 and the protruding portion 2031 of the reflective cavity body 203, while in a case that no electric field exists between the first electrode 102 and the second electrode 202, the surface of the recessed portion 1041 of the reflective trough 104 and the surface of the protruding portion 2031 of the reflective cavity body 203 are in close fit.

For example, in order to improve a use rate of light, the first electrode 102 and the second electrode 202 can adopt a transparent conductive material. For example, the first electrode 102 and the second electrode 202 can be metal electrodes or transparent oxide electrodes, etc., wherein the metal electrodes can reflect the light rays entering the display panel, and increase the reflectivity.

For example, the electrostriction layer 103 adopts a material having an electrostriction performance. The electrostriction performance for example refers to that a electrostriction material can be deformed under an action of the electric field, for example, a thickness of the electrostriction material is increased or decreased under the action of the electric field. For example, the electrostriction material can generate a strain in direct proportion to the square of field intensity under the action of the electric field. The electrostriction layer 103 can adopt one or a combination of the following materials: nano-barium titanate, polyurethane complex or ceramic. The material of the electrostriction layer 103 is not limited to the listed cases. For example, the electrostriction layer 103 can be manufactured by adopting a nano-impressing method, but not limited thereto, and can also be manufactured by adopting other methods.

For example, in each individual display unit (sub-pixel) of the display panel, a thickness of the middle gap (for example, the air interlayer) can be controlled to realize conversion between a total reflection state and a light transmission state of the reflective cavity body 203.

Figure 4:
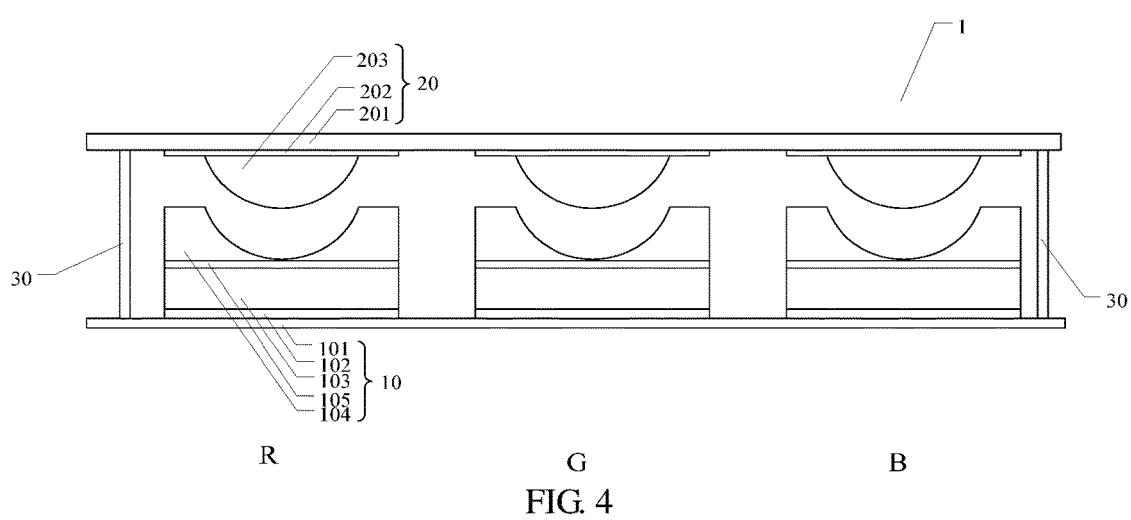
FIG. 4 is a schematic diagram of another display panel provided by Embodiment 1 of the present disclosure.

As shown in FIGS. 2 and 3, each display unit 1 is correspondingly provided with supports 30; or as shown in FIG. 4, a plurality of display units 1 are disposed between two adjacent supports 30. In FIGS. 2 to 4, the supports 30 are disposed between the first base substrate 101 and the second base substrate 201, and of course, can also be disposed between the first electrode 102 and the second electrode 202, and the present embodiment does not limit the disposing manner of the supports 30 as long as an action of keeping the distance between the first base substrate 101 and the second base substrate 201 unchanged is achieved. The supports 30 can adopt a photoresist material, but not limited thereto. FIG. 4 shows that the light absorption layer 105 can be a color light filter layer, and the color light filter layer for example includes three primary colors of Red (R), Green (G) and Blue (B). One pixel includes a plurality of sub-pixels, FIG. 4 shows an R sub-pixel, a G sub-pixel and a B sub-pixel, and one display unit 1 corresponds to one sub-pixel, but not limited thereto. For one pixel, one display unit 1 can also correspond to a plurality of sub-pixels, or a plurality of display units 1 correspond to one sub-pixel.

Figure 5:
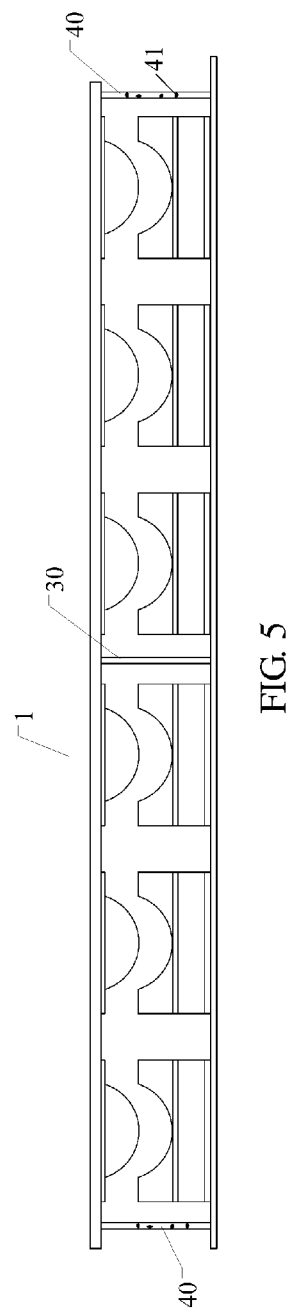
FIG. 5 is a schematic diagram of yet another display panel provided by Embodiment 1 of the present disclosure.

In one example, as shown in FIG. 5, in order to obtain a stable optical effect and a better supporting box thickness, sealant 40 can be disposed on the peripheries of the first base substrate 101 and the second base substrate 201 to seal the first substrate 10 and the second substrate 20. For example, the box thickness can be greater than or equal to 15 micrometers. The sealant 40 contains nanospheres or nanorods 41 to perform box thickness supporting. A material of the nanospheres or nanorods 41, for example, includes silicon oxide or resin, but not limited thereto. In this example, the material of the nanospheres or nanorods 41 is not limited as long as an action of the box thickness supporting is achieved. In a case that the size of a manufactured display device is not large, the sealant 40 can also serve as the support 30, that is, the support 30 is only disposed on the periphery of the display unit 1.

The plurality of display units 1 can form array arrangement, in FIGS. 2 to 5, each display unit 1 is provided with a block first electrode 102, the first electrodes 102 in the plurality of display units 1 are independent block electrodes, each display unit 1 is disposed provided with a block second electrode 202, and the second electrodes 202 in the plurality of display units 1 are independent block electrodes. The present embodiment takes such cases as an example for explanation but not limited thereto. For example, one of the first electrodes 102 and the second electrodes 202 can be disposed on a whole surface (a planar electrode which can correspond to a plurality of display units), and the other is a plurality of independent block electrodes as long as each display unit can perform light regulation individually (transmission or total reflection) for display. The present embodiment does not limit the disposing manner of the first electrodes 102 and the second electrodes 202.

For example, the first electrode 102 and the second electrode 202 can be respectively connected to a drive IC by respective leads, and the drive IC is configured to apply a voltage to the first electrode 102 and the second electrode 202 of each display unit 1.

The display panel provided by the present embodiment has at least one of the following advantageous effects.

(1) No electronic ink needs to be disposed, thereby avoiding a particle agglomeration phenomenon.

(2) The structure is relatively simple, an all solid state can be adopted, a manufacturing procedure is relatively simple, encapsulation is simple, a manufacturing process is simple and yield can be improved.

(3) The electrostriction material is adopted, the structure is simple, the repeatability is good and the cost is reduced.

(4) The reflection principle is adopted, ambient light is used for display, and the reading effect under strong light is better.

(5) The electrostriction material is adopted as a total reflection medium adjustment and control mechanism, the structure is simple, the repeatability is good and the cost is reduced.

(6) A drive electric field of the electrostriction material is poor in intensity, and the electrostriction material can have a shape memory function, and is low in power consumption when static display is realized, and the power consumption is effectively reduced.

(7) The electrostriction material has better mechanical flexibility, can enable the reflective cavity body and the reflective trough to be better combined, and has well processability and lower processing cost.

(8) The electrostriction material is high in response speed, such that the display device containing such display panel has better dynamic display performance.

Embodiment 2

The present embodiment provides a manufacturing method for a display panel, which comprises steps of:

Forming a first electrode 102, an electrostriction layer 103 and a reflective trough 104 on a first base substrate 101 to manufacture a first substrate 10;

Forming a second electrode 202 and a reflective cavity body 203 on a second base substrate 201 to manufacture a second substrate 20; and Opposing the first substrate 10 to the second substrate 20, and forming a support 30 between the first base substrate 101 and the second base substrate 201, such that a distance between the first base substrate 101 and the second base substrate 201 is kept constant.

The reflective trough 104 has a recessed portion 1041, the reflective cavity body 203 has a protruding portion 2031, and a surface of the recessed portion 1041 of the reflective trough 104 matches with a surface of the protruding portion 2031 of the reflective cavity body 203.

The first electrode 102 and the second electrode 202 are configured to form an electric field, the electrostriction layer 103 is caused to be deformed in a direction perpendicular to the first base substrate 101 under an action of the electric field, such that a thickness of the electrostriction layer 103 is increased or decreased; therefore, a state where a gap 431 is formed between the recessed portion 1041 of the reflective trough 104 and the protruding portion 2031 of the reflective cavity body 203 and a state where the recessed portion 1041 of the reflective trough 104 and the protruding portion 2031 of the reflective cavity body 203 are in close fit can be converted.

The manufacturing method for a display panel provided by the present embodiment adopts an all solid state for manufacturing, an encapsulation process is simple and the yield is improved.

In one example, the manufacturing method for a display panel further includes forming a light absorption layer 105, and the description on the light absorption layer 105 can refer to the description of Embodiment 1.

For example, during encapsulation, the gap 431 is enabled to be formed between the recessed portion 1041 of the reflective trough 104 and the protruding portion 2031 of the reflective cavity body 203. Therefore, when the electrostriction layer 103 stretches under the action of the electric field (a thickness is increased), the recessed portion 1041 of the reflective trough 104 and the protruding portion 2031 of the reflective cavity body 203 are in close fit.

For example, during encapsulation, the recessed portion 1041 of the reflective trough 104 and the protruding portion 2031 of the reflective cavity body 203 can be in close fit. Therefore, when the electrostriction layer 103 contracts under the action of the electric field (a thickness is decreased), the gap 431 is enabled to be formed between the recessed portion 1041 of the reflective trough 104 and the protruding portion 2031 of the reflective cavity body 203

The display panel in Embodiment 1 can be formed by adopting the manufacturing method of the present embodiment.

Same or similar contents in the manufacturing method for a display panel of the present embodiment and the display panel provided by Embodiment 1 can refer to each other and are not repeated herein.

Embodiment 3

The present embodiment provides a display device, including any display panel according to Embodiment 1. Therefore, a mechanical deformation reflective display device can be formed.

Advantageous effects of the reflective display device provided by the present embodiment can refer to those of the display panel of Embodiment 1.

The following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged. However, it should understood that, in the case in which a component or element such as a layer, film, area, substrate or the like is referred to be "on" or "under" another component or element, it may be directly on or under the another component or element or a component or element is interposed therebetween.

(3) In case of no conflict, features in one embodiment or in different embodiments can be combined.

The foregoing is only embodiment modes of the present disclosure and not intended to limit the scope of protection of the present disclosure. Any change or replacement that may be easily thought of by those skilled in the art within the technical scope disclosed by the present disclosure shall fall within the scope of protection of the present disclosure. Therefore, the scope of protection of the present disclosure shall be defined by the appended claims.

The application claims priority to the Chinese patent application No. 201610967155.1, filed Oct. 28, 2016, the present disclosure of which is incorporated herein by reference as part of the application.

The invention claimed is:

1. A display panel, comprising a plurality of display units, each display unit including a first substrate and a second substrate opposite to each other, and a support, wherein:

the first substrate includes a first base substrate and a first electrode, an electrostriction layer and a reflective trough which are disposed thereon;

the second substrate includes a second base substrate and a second electrode and a reflective cavity body which are disposed thereon; and the support is disposed between the first base substrate and the second base substrate, such that a distance between the first base substrate and the second base substrate is kept constant;

the reflective trough having a recessed portion, the reflective cavity body having a protruding portion, a surface of the recessed portion of the reflective trough matching with a surface of the protruding portion of the reflective cavity body, the first electrode and the second electrode being configured to form an electric field, the electrostriction layer being deformable in a direction perpendicular to the first base substrate under an action of the electric field, such that a thickness of the electrostriction layer is increased or decreased to convert between a state where a gap presents between the recessed portion of the reflective trough and the protruding portion of the reflective cavity body and a state where the surface of the recessed portion of the reflective trough and the surface of the protruding portion of the reflective cavity body are in close fit.

2. The display panel according to claim 1, wherein the electric field is for increasing the thickness of the electrostriction layer, such that the surface of the recessed portion of the reflective trough and the surface of the protruding portion of the reflective cavity body are in close fit when the electric field is applied between the first electrode and the second electrode, and a gap presents between the recessed portion of the reflective trough and the protruding portion of the reflective cavity body when no electric field is applied between the first electrode and the second electrode.

3. The display panel according to claim 2, wherein the electric field is for decreasing the thickness of the electrostriction layer, such that a gap presents between the recessed portion of the reflective trough and the protruding portion of the reflective cavity body when the electric field is applied between the first electrode and the second electrode, and the surface of the recessed portion of the reflective trough and the surface of the protruding portion of the reflective cavity body are in close fit when no electric field is applied between the first electrode and the second electrode.

4. The display panel according to claim 2, wherein the gap includes an air layer.

5. The display panel according to claim 4, wherein the reflective trough and the reflective cavity body adopt a light transmittance material with a high refractive index, and the refractive indexes thereof are greater than that of the air layer.

6. The display panel according to claim 2, wherein the refractive index of the reflective trough is same or substantially same as that of the reflective cavity body.

7. The display panel according to claim 1, wherein the electric field is for decreasing the thickness of the electrostriction layer, such that a gap presents between the recessed portion of the reflective trough and the protruding portion of the reflective cavity body when the electric field is applied between the first electrode and the second electrode, and the surface of the recessed portion of the reflective trough and the surface of the protruding portion of the reflective cavity body are in close fit when no electric field is applied between the first electrode and the second electrode.

8. The display panel according to claim 7, wherein the gap includes an air layer.

9. The display panel according to claim 1, wherein the gap includes an air layer.

10. The display panel according to claim 9, wherein the reflective trough and the reflective cavity body adopt a light transmittance material with a high refractive index, and the refractive indexes thereof are greater than that of the air layer.

11. The display panel according to claim 1, wherein refractive index of the reflective trough is same or substantially same as that of the reflective cavity body.

12. The display panel according to claim 1, wherein refractive indexes of the reflective trough and the reflective cavity body are within a range of 1.6 to 1.8.

13. The display panel according to claim 1, wherein the protruding portion of the reflective cavity body is hemispherical.

14. The display panel according to claim 1, further comprising a light absorption layer, wherein the light absorption layer is disposed between the electrostriction layer and the reflective trough.

15. The display panel according to claim 1, wherein the first electrode and the second electrode both adopt transparent conductive material.

16. The display panel according to claim 1, further comprising sealant disposed between the first base substrate and the second base substrate, wherein the sealant includes nanospheres or nanorods.

17. A display device, comprising the display panel according to claim 1.

18. A manufacturing method for a display panel, comprising:
   forming a first electrode, an electrostriction layer and a reflective trough on a first base substrate to manufacture a first substrate,
   forming a second electrode and a reflective cavity body on a second base substrate to manufacture a second substrate,
   opposing the first substrate to the second substrate, and forming a support between the first base substrate and the second base substrate, such that a distance between the first base substrate and the second base substrate is kept constant, wherein:
   the reflective trough has a recessed portion, the reflective cavity body has a protruding portion, and a surface of the recessed portion of the reflective trough matches with a surface of the protruding portion of the reflective cavity body,
   the first electrode and the second electrode are configured to form an electric field, the electrostriction layer is deformable in a direction perpendicular to the first base substrate under an action of the electric field, such that a thickness of the electrostriction layer is increased or decreased to convert between a state where a gap presents between the recessed portion of the reflective trough and the protruding portion of the reflective cavity body and a state where the surface of the recessed portion of the reflective trough and the surface of the protruding portion of the reflective cavity body are in close fit.

19. The manufacturing method for a display panel according to claim 18, wherein, during encapsulation, the gap presents between the recessed portion of the reflective trough and the protruding portion of the reflective cavity body.

20. The manufacturing method for a display panel according to claim 18, wherein, during encapsulation, the recessed portion of the reflective trough and the protruding portion of the reflective cavity body are in close fit.

* * * * *